United States Patent
Pereira et al.

(10) Patent No.: US 12,325,004 B2
(45) Date of Patent: Jun. 10, 2025

(54) ACID GAS SCRUBBING METHODS FEATURING AMINE PHASE SEPARATION FOR HYDROGEN SULFIDE CAPTURE

(71) Applicant: ExxonMobil Technology and Engineering Company, Annandale, NJ (US)

(72) Inventors: Carla S. Pereira, Bridgewater, NJ (US); Jenny P. Seagraves, Spring, TX (US); P. Scott Northrop, Lexington, KY (US); Michael Siskin, Westfield, NJ (US); Thomas Ingram, Mannheim (DE); Gerald Vorberg, Speyer (DE); Martin Ernst, Heidelberg (DE); Georg K. Sieder, Bad Duerkheim (DE)

(73) Assignee: ExxonMobil Technology & Engineering Company, Annandale, NJ (US)

( * ) Notice: Subject to any disclaimer, the term of this patent is extended or adjusted under 35 U.S.C. 154(b) by 0 days.

(21) Appl. No.: 18/002,519

(22) PCT Filed: Jul. 6, 2021

(86) PCT No.: PCT/US2021/040478
§ 371 (c)(1),
(2) Date: Dec. 20, 2022

(87) PCT Pub. No.: WO2022/010874
PCT Pub. Date: Jan. 13, 2022

(65) Prior Publication Data
US 2023/0226483 A1    Jul. 20, 2023

Related U.S. Application Data

(60) Provisional application No. 62/705,610, filed on Jul. 7, 2020.

(51) Int. Cl.
*B01D 53/52* (2006.01)
*B01D 53/14* (2006.01)
(Continued)

(52) U.S. Cl.
CPC ..... *B01D 53/1425* (2013.01); *B01D 53/1468* (2013.01); *B01D 53/1475* (2013.01);
(Continued)

(58) Field of Classification Search
None
See application file for complete search history.

(56) References Cited

U.S. PATENT DOCUMENTS 4,093,701 A    6/1978  Butwell
4,112,052 A    9/1978  Sartori et al.
(Continued)

FOREIGN PATENT DOCUMENTS

EP    0134948 A2    3/1985
FR    2898284 A1    9/2007
(Continued)

OTHER PUBLICATIONS

European Patent Application No. 21836963.5; Extended European Search Report for Applicant ExxonMobil Technology and Engineering Company dated Jul. 4, 2024.
(Continued)

*Primary Examiner* — Daniel Berns
(74) *Attorney, Agent, or Firm* — Jones Walker LLP

(57) ABSTRACT

Capture of hydrogen sulfide from a gas mixture may be accomplished using an aqueous solution comprising an amine. Certain sterically hindered amines may selectively form a reaction product with hydrogen sulfide under kinetically controlled contacting conditions and afford a light phase and a heavy phase above a critical solution temperature, wherein the hydrogen sulfide may be present in either
(Continued)

phase. Upon separation of the light phase from the heavy phase, processing of one of the phases may take place to remove hydrogen sulfide therefrom. Recycling of the amine to an absorber tower may then take place to promote capture of additional hydrogen sulfide.

19 Claims, 6 Drawing Sheets

(51) Int. Cl.
  *B01D 53/62* (2006.01)
  *B01D 53/78* (2006.01)
  *B01D 53/96* (2006.01)
(52) U.S. Cl.
  CPC ......... *B01D 53/1493* (2013.01); *B01D 53/52* (2013.01); *B01D 53/62* (2013.01); *B01D 53/78* (2013.01); *B01D 53/96* (2013.01); *B01D 2252/20405* (2013.01); *B01D 2252/2041* (2013.01); *B01D 2252/20426* (2013.01); *B01D 2252/20452* (2013.01); *B01D 2252/20468* (2013.01); *B01D 2252/20484* (2013.01); *B01D 2252/60* (2013.01); *B01D 2257/304* (2013.01); *B01D 2257/504* (2013.01)

(56) References Cited

U.S. PATENT DOCUMENTS

| | | | |
|---|---|---|---|
| 4,405,581 A | 9/1983 | Savage et al. | |
| 4,405,583 A | 9/1983 | Stogryn et al. | |
| 4,405,585 A | 9/1983 | Sartori et al. | |
| 4,471,138 A | 9/1984 | Stogryn | |
| 4,894,178 A | 1/1990 | Ho et al. | |
| 8,486,183 B2 | 7/2013 | Siskin et al. | |
| 2010/0037775 A1 | 2/2010 | Siskin et al. | |
| 2013/0142717 A1 | 6/2013 | Siskin et al. | |
| 2013/0243676 A1 | 9/2013 | Siskin et al. | |
| 2013/0243677 A1 | 9/2013 | Siskin et al. | |
| 2014/0360368 A1 | 12/2014 | Kawasaki | |
| 2015/0027055 A1 | 1/2015 | Kortunov et al. | |
| 2015/0027056 A1 | 1/2015 | Kortunov et al. | |
| 2015/0093314 A1* | 4/2015 | Critchfield | B01D 53/1468 252/190 |
| 2017/0320008 A1 | 11/2017 | Weiss et al. | |
| 2018/0272269 A1 | 9/2018 | Natuurweten | |

FOREIGN PATENT DOCUMENTS

| | | |
|---|---|---|
| FR | 3014328 A1 | 6/2015 |
| WO | 2015065839 A1 | 5/2015 |

OTHER PUBLICATIONS

PCT Application No. US2021/040478; International Search Report and Written Opinion of the International Searching Authority for Applicant ExxonMobil Research and Engineering Company dated Sep. 16, 2021.

PCT Application No. US2016/064529; International Search Report and Written Opinion of the International Searching Authority for Applicant ExxonMobil Research and Engineering Co., et al dated Apr. 26, 2017.

* cited by examiner

ACID GAS SCRUBBING METHODS FEATURING AMINE PHASE SEPARATION FOR HYDROGEN SULFIDE CAPTURE

FIELD OF THE INVENTION

The present disclosure relates to acid gas scrubbing methods using an amine.

BACKGROUND OF THE INVENTION

Scrubber systems are frequently used to remove unwanted gasses from a fluid stream, such as acid gasses from a gas stream. Removal of acid gasses, such as hydrogen sulfide and carbon dioxide, for example, is often necessary before further use and/or environmental release of the gas stream may take place. Removal of hydrogen sulfide in preference to carbon dioxide may be highly desirable due to the extreme toxicity and highly corrosive nature of this gas. Once capture and separation of hydrogen sulfide from carbon dioxide has taken place, the carbon dioxide may, if desired, be used for enhanced oil recovery (EOR) operations or subjected to various carbon capture technologies, as desired. Selective separation of hydrogen sulfide over carbon dioxide may be difficult to realize in many instances, particularly in an energy-efficient manner.

Various technologies are available for removing acid gasses from a gas stream and performing separation thereof, such as, for example, chemical separation using an amine, physical separation based on solubility in an organic solvent or an ionic liquid, cryogenic distillation (Ryan Holmes process), and membrane-based separations. Amine-based separations represent a highly developed scrubbing technology for acid gasses, with various amines, alkanolamines, and mixtures thereof having relatively simple structures being employed in competing acid gas scrubbing processes. Such species are generically referred to as "amines" in the disclosure herein. Illustrative amines that are commonly employed in acid gas scrubbing processes include, for example, monoethanolamine (MEA), diethanolamine (DEA), triethanolamine (TEA), N-methyldiethanolamine (MDEA), diisopropylamine (DIPA), diglycolamine (DGA), 2-amino-2-methyl-1-propanol (AMP), piperazine (PZ), and ethoxyethanol-tert-butylamine (EETB), with MEA, DEA, and MDEA being among the most commonly used. The ExxonMobil FLEXSORB®SE system is an illustrative amine-based acid gas treatment process. Acid gas scrubbing processes using an amine usually entail contacting a gas mixture in a countercurrent fashion with an aqueous solution of the amine in an absorber tower. The aqueous solution exiting the absorber tower is then processed in a separate regeneration tower to desorb the acid gasses, and the regenerated amine is then returned to the absorber tower in an aqueous solution to perform additional acid gas separation.

FIG. 1 shows a diagram of a conventional amine-based system for acid gas scrubbing, in which an aqueous amine solution remains monophasic during acid gas capture and processing, among which may include the amine-based system described in further detail in U.S. Pat. No. 8,486,183. In system 100, gas mixture 102 is fed into absorber tower 104. Gas mixture 102 may pass through absorber tower 104, wherein contact between acid gasses and aqueous amine solution 118 may take place to form one or more reaction products via an acid-based reaction. Aqueous amine solution 118 and gas mixture 102 are fed into absorber tower 104 such that contact between the two takes place in a countercurrent manner, as shown in FIG. 1. Contacting may alternatively be conducted co-currently as well. Scrubbed gas mixture 106, which contains a lower amount of at least one acid gas than does gas mixture 102, exits the top of absorber tower 104, and aqueous reaction product solution 110, containing the reaction product(s) of one or more acid gasses with an amine, exits the bottom of absorber tower 104. Aqueous reaction product solution 110 may be conveyed to heat exchanger 112 where it may absorb heat to form heated aqueous solution 120. Additional heaters (not shown) may also be present. Heated aqueous solution 120 may then be conveyed to regeneration tower 122, where further heating may take place to convert the one or more acid gas reaction products back into the amine After stripping, acid gasses may exit regeneration tower 122 as acid gas stream 124 and residual condensates 126 may be subsequently collected therefrom. De-gassed aqueous amine solution 128 exits regeneration tower 122 and is conveyed to reboiler 130. Vapor 132 from reboiler 130 may be returned to regeneration tower 122, and regenerated aqueous amine solution 134 may be conveyed to heat exchanger 112. Following heat exchange, heat-exchanged, regenerated aqueous amine solution 114 may be optionally cooled further in cooler 116 prior to reentering absorber tower 104.

Since an aqueous solution is processed in the regeneration tower, significant energy input is required to vaporize the water concurrently with the amine to facilitate gas desorption, thereby leading to high operating costs. In many instances, a significant portion of the operating cost of a scrubber system may be attributed to energy requirements for the regeneration tower. For example, a regeneration tower may operate at a temperature of about 115° C. to about 150° C. and at pressure of about 0.11 MPa (16 psi) to about 0.3 MPa (44 psi) (at regeneration tower bottom) to accommodate processing of an aqueous amine solution. Additionally, amines such as monoethanolamine (MEA) and diethanolamine (DEA), for example, may require large amounts of energy to promote extraction of acid gasses, especially carbon dioxide.

As a further difficulty in conventional acid gas scrubbing processes, phase separation of the aqueous amine solution following acid gas absorption may also be problematic for some amines Phase separation may be particularly problematic with respect to providing a homogeneous aqueous amine solution to the regeneration tower, especially by limiting the temperature at which regeneration may be performed.

Although it is commonly desirable to remove hydrogen sulfide and carbon dioxide simultaneously from a gas stream, selective separation of hydrogen sulfide may be preferred in some instances. Natural gas pipeline specifications, for example, often set more stringent limits for hydrogen sulfide than for carbon dioxide due to the high toxicity and corrosiveness of the former. In addition, many industrial processes may be tolerant of carbon dioxide, whereas they may be intolerant of hydrogen sulfide. Selective removal of hydrogen sulfide may facilitate use of a more economical treatment plant and provide an enriched hydrogen sulfide feed to a sulfur recovery unit. In addition, carbon dioxide scrubbing may necessitate excessively high energy input in some cases. Unfortunately, many amines display limited selectivity toward absorption of hydrogen sulfide over carbon dioxide, and the foregoing advantages may be difficult to realize.

SUMMARY OF THE INVENTION

The present disclosure provides methods for selectively capturing hydrogen sulfide from a gas mixture. The methods comprise: contacting a gas mixture comprising hydrogen sulfide with an aqueous solution comprising an amine in an absorber tower under kinetically controlled contacting conditions; wherein the amine has a higher binding selectivity for hydrogen sulfide than for carbon dioxide under the kinetically controlled contacting conditions, and the aqueous solution undergoes liquid phase separation above a critical solution temperature; forming a reaction product of the hydrogen sulfide and the amine in the aqueous solution; heating the aqueous solution to a temperature greater than or equal to the critical solution temperature, thereby forming a light phase comprising the amine and a heavy phase comprising water wherein a majority of the reaction product of the hydrogen sulfide and the amine is present in either the light phase or the heavy phase; separating the light phase from the heavy phase; processing one of the light phase or the heavy phase to remove at least some hydrogen sulfide therefrom; and after separating the light phase from the heavy phase, recycling at least a portion of the light phase to the absorber tower.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
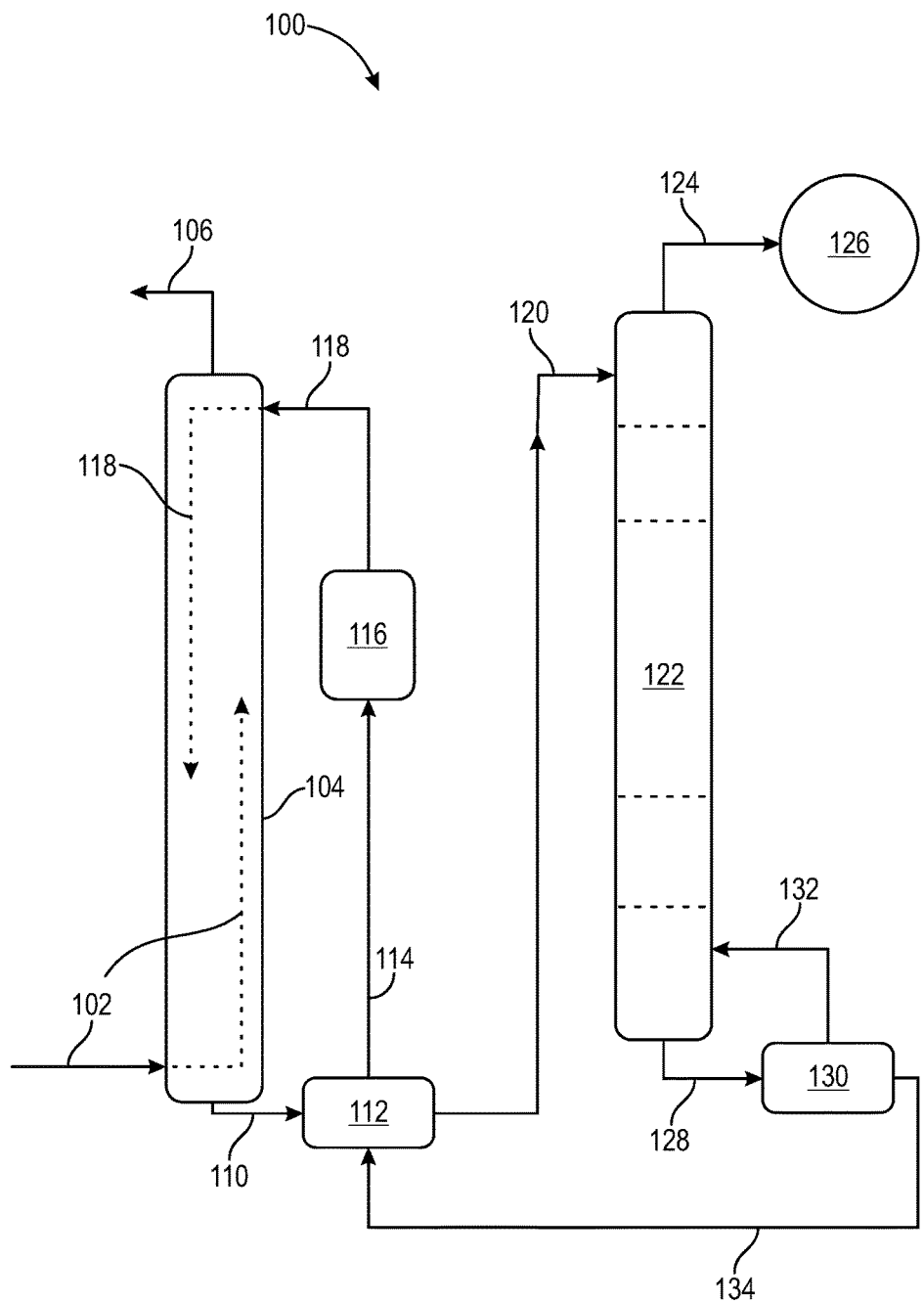
FIG. 1 shows a diagram of a conventional amine-based system for acid gas scrubbing, in which an aqueous amine solution remains monophasic during acid gas capture and processing.

The present disclosure relates to acid gas scrubbing methods using an amine and, more particularly, acid gas scrubbing methods employing an amine that has binding selectivity for hydrogen sulfide over carbon dioxide, particularly under kinetically controlled contacting conditions, and undergoes phase separation from an aqueous amine solution above a critical solution temperature. The selectivity for hydrogen sulfide binding accompanied by phase separation above the critical solution temperature may facilitate advantageous and energetically favorable recycling of the amine and aqueous components of the aqueous amine solution compared to conventional amine-based scrubbing processes, as described in further detail herein.

In the disclosure herein the term "amine" refers to any compound comprising at least one primary, secondary or tertiary amino group. As such, the term "amine" broadly encompasses monoamines, diamines, triamines, alkanolamines, the like, and any mixture thereof. Preferably, amines suitable for use in the disclosure herein comprise an amine, an alkanolamine, or any mixture thereof.

As alluded to above, recycling of aqueous amine solutions during conventional acid gas scrubbing processes may require input of significant amounts of energy to facilitate acid gas desorption in the regeneration tower, primarily due to the high heat of vaporization of water. As a solution to the foregoing issue, the present disclosure employs aqueous amine solutions that exhibit high binding selectivity for hydrogen sulfide over carbon dioxide under kinetically controlled contacting conditions and undergo phase separation above a critical solution temperature. The phase separation accompanied by the high binding selectivity allows a majority of the reaction product of hydrogen sulfide and the amine to become located in either a light phase (amine phase) or a heavy phase (aqueous phase), depending upon the particular amine being used, once phase separation occurs. The reaction product of hydrogen sulfide and the amine and the reaction product of carbon dioxide and the amine may be present in the same phase or in different phases. Regardless of how the reaction products are partitioned between the two phases, including whether the reaction product of the hydrogen sulfide and the amine is present in the light phase or in the heavy phase, advantageous processing benefits may be realized through practicing the disclosure herein. In particular, processing of the light phase and the heavy phase to promote recycling thereof may take place separately (if processing is even needed at all), thereby lowering the processing burden upon the regeneration tower and decreasing energy input costs. A phase that is sufficiently free of acid gasses, for example, need not necessarily be processed and may be returned to the absorber tower. Features and advantages of particular phase separation configurations and further details of the present disclosure are provided in greater detail hereinbelow.

Sterically hindered amines may exhibit binding selectivity for hydrogen sulfide over carbon dioxide, particularly under kinetically controlled contacting conditions. In particular, secondary amines bearing a tertiary alkyl group (e.g., t-butyl or t-amyl) and/or tertiary amines may exhibit sufficient steric hindrance that they may selectively capture hydrogen sulfide over carbon dioxide under kinetically controlled contacting conditions. Such sterically hindered amines may form bicarbonate as a reaction product in the presence of carbon dioxide. This may impact the binding selectivity toward hydrogen sulfide as well. Surprisingly, the binding selectivity may be reversed under longer-term thermodynamically controlled contacting conditions. Without being bound by theory or mechanism, steric hindrance of the secondary and tertiary amines employed herein may allow a reaction product to form rapidly and selectively with hydrogen sulfide, whereas formation of the reaction product may take longer with carbon dioxide. At longer contacting times, a thermodynamic reaction product may form through preferential displacement of the hydrogen sulfide with carbon dioxide. Since preferential hydrogen sulfide binding occurs under kinetically controlled contacting conditions, the amines employed in the present disclosure may advantageously support high-throughput acid gas scrubbing processes for separating or capturing hydrogen sulfide. Additional details concerning the kinetically controlled contacting conditions and suitable amines are provided hereinbelow.

Accordingly, the present disclosure provides methods for acid gas scrubbing using an aqueous solution comprising an amine having a higher binding selectivity for hydrogen sulfide than for carbon dioxide, and in which the aqueous solution undergoes liquid phase separation above a critical solution temperature, which may be about 140° C. or below in particular process implementations. The methods comprise: contacting a gas mixture comprising hydrogen sulfide with the aqueous solution in an absorber tower under kinetically controlled contacting conditions; forming a reaction product of the hydrogen sulfide and the amine in the aqueous solution; heating the aqueous solution to a temperature greater than or equal to the critical solution temperature, thereby forming a light phase comprising the amine and a heavy phase comprising water; separating the light phase from the heavy phase; processing one of the light phase or the heavy phase to remove at least some hydrogen sulfide therefrom; and after separating the light phase from the heavy phase, recycling at least a portion of the light phase to the absorber tower. A majority of the reaction product of the hydrogen sulfide and the amine may be present in either the light phase or the heavy phase. Depending on the distribution of the reaction product of the hydrogen sulfide and the amine, the light phase may be recycled to the absorber tower, either directly or indirectly without undergoing further processing, or undergo further processing before being returned, as discussed in further detail below.

As indicated above and discussed in further detail below, the advantages of the present disclosure may be realized irrespective of the phase in which the reaction product of the hydrogen sulfide and the amine ultimately resides. Certain amines may lead to distribution of the reaction product in the light phase, and others may lead to distribution of the reaction product in the heavy phase. Thus, a suitable amine for use in the present disclosure may be selected based upon various application-specific factors (e.g., binding selectivity, capacity, cost, stability, process operating conditions, and the like) without excessive concern of where the reaction product ultimately resides, since the present disclosure may be adapted to accommodate either disposition of the reaction product.

Moreover, the reaction product of hydrogen sulfide and the amine may be present in the same phase or in a different phase as a reaction product of carbon dioxide and the amine. Either distribution of the reaction products in combination may be effectively and advantageously addressed through use of the disclosure herein.

Amines suitable for use in present disclosure include hindered secondary amines and/or tertiary amines, including mixtures thereof, particularly secondary amines containing at least one tertiary alkyl group located upon the amine nitrogen atom, such as t-butyl or t-amyl. The term "secondary amine" refers to a basic nitrogen atom bound to two carbon atoms (e.g., two hydrocarbyl groups, either of which may be optionally substituted with one or more heteroatoms) and one hydrogen atom. Similarly, the term "tertiary amine" refers to a basic nitrogen atom bound to three carbon atoms (e.g., three hydrocarbyl groups, any of which may be optionally substituted with one or more heteroatoms). The terms "secondary amine" and "tertiary amine" refer to compounds containing at least one of these types of amine functional groups, or compounds containing at least one additional functional group, such as alkanolamines or capped (etherified) alkanolamines containing a secondary or tertiary amine A "tertiary alkyl group" refers to a quaternary carbon atom bound to three other carbon atoms (e.g., three hydrocarbyl groups, any of which may be optionally substituted with one or more heteroatoms). A tertiary N-alkyl group refers to a tertiary alkyl group also having a bond to an amine nitrogen atom. Particular examples of amines that may be employed in the present disclosure include, but are not limited to, secondary and tertiary amines having a structure represented by one or more of Formulas 1-8 in Table 1 below.

TABLE 1

| Formula No. | Chemical Structure and IUPAC Name | Abbreviation |
|---|---|---|
| 1 | 1,3-bis(tert-butylamino)propan-2-ol | BTBP |
| 2 | 1,2-bis(tert-butylaminoethoxy)ethane | BTBEE |
| 3 | methoxyethoxyethoxyethyl-tert-butylamine | M3ETB |

TABLE 1-continued

| Formula No. | Chemical Structure and IUPAC Name | Abbreviation |
|---|---|---|
| 4 | 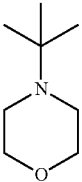<br>tert-butylmorpholine | TBM |
| 5 | 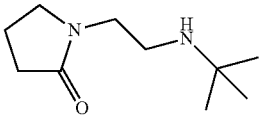<br>1-(2-(tert-butylamino)ethyl)pyrrolidin-2-one | TBAEPY |
| 6 | 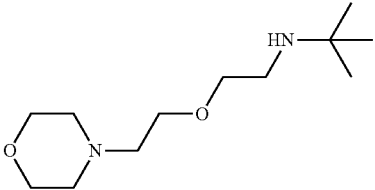 [SMILES: CC(C)(C)NCCOCCN1CCOCC1]<br>tert-butylaminoethoxyethylmorpholine | TBAEEM |
| 7 | 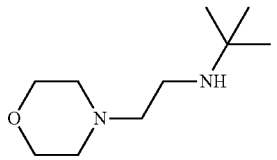<br>tert-butylaminoethylmorpholine | TBAEM |
| 8 | 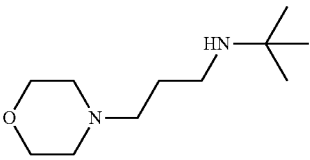<br>tert-butylaminopropylmorpholine | TBAPM |

The compounds in Table 1 may undergo phase separation over a range of temperatures. Particularly suitable amines may have a critical solution temperature ranging from about 50° C. to about 160° C., or about 50° C. to about 150° C., or about 50° C. to about 140° C., or about 100° C. to about 140° C.

As will be appreciated by one having ordinary skill in the art, the amine concentration in the aqueous solution may be varied depending upon the solubility limit of the amine, the solubility limit of the reaction product(s) resulting from acid gas capture, and to accommodate various application-specific needs, such as to promote scrubbing efficiency and $H_2S$ binding selectivity, for example. The binding selectivity for $H_2S$, for example, may vary as the amine concentration is changed. Accordingly, the concentration of the amine in the aqueous solution may range from about 15 wt % to about 70 wt %, or from about 15 wt % to about 50 wt %, or from about 15 wt % to about 25 wt %, or from about 25 wt % to about 50 wt %, or from about 30 wt % to about 45 wt %, or from about 35 wt % to about 45 wt %. Here, the amine concentration refers to the concentration of the amine in its unbound form or amine mixtures prior to forming a reaction product therefrom.

Optionally, the aqueous solution may further comprise a water-miscible additive, which may or may not impact the critical solution temperature. Suitable additives may include, but are not limited to, organic solvents such as triethylene glycol monomethyl ether (MTEG) and sulfolane, and acids such as phosphoric acid and sulfuric acid. Such additives may be included in the aqueous solution at a concentration up to about 20 wt %, such as from about 0.01 wt % to about 20 wt %, or from about 0.01 wt % to about 10 wt %, or from about 1 wt % to about 5 wt %, or from 0.5 wt % to about 2 wt %. In addition to impacting the critical solution temperature in some cases, the additives may alter the selectivity for hydrogen sulfide binding as well.

In the present disclosure, contact between the gas mixture and the aqueous solution may take place under kinetically controlled contacting conditions, as described further below. Under kinetically controlled contacting conditions, suitable amines for use in the present disclosure, such as those listed above, exhibit faster reactivity with hydrogen sulfide than with carbon dioxide. Therefore, such amines may have a higher initial binding selectivity for hydrogen sulfide than for carbon dioxide, since the reaction product of hydrogen sulfide and the amine forms more readily than does the reaction product of carbon dioxide and the amine under the kinetically controlled contacting conditions. In the present disclosure, the reaction product of the hydrogen sulfide and the amine may reside in either the light phase or the heavy phase following phase separation. Process considerations dependent upon where the reaction product of the hydrogen sulfide and the amine resides are considered in greater detail below.

In addition to those containing hydrogen sulfide, gas mixtures that may be processed according to the disclosure herein include those comprising one or more other acid gasses, such carbon dioxide ($CO_2$), sulfur dioxide ($SO_2$), hydrogen cyanide (HCN), carbonyl sulfide (COS), the like, or any combination thereof.

In a particular example, the gas mixture may further comprise carbon dioxide, from which gas a reaction product of the carbon dioxide and the amine may also be formed in the aqueous solution. The reaction product of the carbon dioxide and the amine may be present in the light phase or the heavy phase and/or present in the same phase or a different phase than the reaction product of the hydrogen sulfide and the amine. The methods of the present disclosure are applicable irrespective of the phase in which the reaction product of the carbon dioxide and the amine ultimately resides. More typically, the reaction product of the carbon dioxide and the amine may reside in the aqueous phase. Accordingly, in particular embodiments of the present disclosure, the reaction product of the hydrogen sulfide and the amine and the reaction product of the carbon dioxide and the amine may both reside in the heavy phase, or the reaction product of the hydrogen sulfide and the amine may reside in the light phase and the reaction product of the carbon dioxide and the amine may reside in the heavy phase. Processing of the light phase and the heavy phase in these configurations will be described in greater detail below.

Under kinetically controlled contacting conditions, amines suitable for use in the disclosure herein may be characterized by a higher binding selectivity for hydrogen sulfide than for carbon dioxide. Binding selectivity for hydrogen sulfide may be specified by Equation 1

$$H_2S \text{ Selectivity} = \frac{([H_2S]/[CO_2])_{aqueous\ solution}}{([H_2S]/[CO_2])_{gas\ mixture}} \quad \text{(Equation 1)}$$

wherein $([H_2S]/[CO_2])_{aqueous\ solution}$ is the molar ratio of hydrogen sulfide to carbon dioxide in the aqueous solution, each in the form of a reaction product, and $([H_2S]/[CO_2])_{gas\ mixture}$ is the molar ratio of hydrogen sulfide to carbon dioxide in the gas mixture. Selectivity for hydrogen sulfide is achieved when the ratio in Equation 1 is greater than 1. In particular embodiments of the present disclosure, selectivity for hydrogen sulfide over carbon dioxide may be such that the ratio is greater than or equal to about 2, or greater than or equal to about 4, or greater than or equal to about 6, or greater than or equal to about 8, or greater than or equal to about 10. It is to be appreciated that the selectivity for hydrogen sulfide may vary based on several factors such as, for example, the amine concentration in the aqueous solution, the ratio of hydrogen sulfide to other acid gases in the gas mixture, the molar ratio of acid gasses to amine, and the like.

Contact between the gas mixture and the aqueous solution may take place in an absorber tower. Suitable absorber towers may include any of those conventionally used in the gas processing industry, as well as those that are developed in the future. Contact between the gas mixture and the aqueous solution may take place in a countercurrent fashion in the absorber tower. In alternative process configurations, contact between the gas mixture and the aqueous solution may take place in a co-current fashion.

Contact between the gas mixture and the aqueous solution may take place under kinetically controlled contacting conditions. As used herein, the term "kinetically controlled contacting conditions" refers to any contact time that results in formation of a reaction product with hydrogen sulfide preferentially to formation of a reaction product with carbon dioxide at longer contact times. In this regard, suitable contact times of the aqueous solution and the gas mixture in the absorber tower under kinetically controlled contacting conditions may range from about 2 minutes or less, such as from about 1 second to about 2 minutes, or from about 5 seconds to about 1 minute, or from about 10 seconds to about 40 seconds, or from about 15 seconds to about 30 seconds, or from about 30 seconds to about 60 seconds. It is to be appreciated that suitable kinetically controlled contacting conditions to achieve formation of the reaction product of hydrogen sulfide and the amine may vary depending upon the structure of the amine, the reaction temperature, and the like.

The gas mixture and the aqueous solution may be contacted under countercurrent conditions in the absorber tower. Namely, under countercurrent conditions, the gas mixture may be circulated upwardly in the absorber tower, while the aqueous solution may percolate downwardly through the absorber tower.

Contact between the gas mixture and the aqueous solution may take place at a temperature of about 10° C. to about 80° C., such as about 10° C. to about 70° C., or about 10° C. to about 60° C., or about 10° C. to about 35° C., or about 30° C. to about 60° C., or about 50° C. to about 70° C. In some instances, lower contacting temperatures may be used to improve selectivity for hydrogen sulfide binding. Contacting may be carried out at pressure ranging from about atmospheric pressure or slightly below (0.9 atm to 1 atm, 0.09 MPa to 0.1 MPa) to a pressure of about 100 atm (10 MPa).

Separation of the light phase from the heavy phase after acid gas extraction may take place by any liquid-liquid separation technique known to persons having ordinary skill in the art. Suitable separation techniques may utilize density liquid separation. Decanters, liquid-liquid separators employing density-based separation, continuous extractors, column extractors, and/or the like, including combinations thereof, may be used to promote separation of the light phase from the heavy phase. Decantation may be a particularly suitable phase separation process taking place by density liquid separation. Suitable decanters for promoting decantation may be oriented horizontally or vertically, and their phase separation efficiency may be tailored or enhanced by suitably placed internals such as packings, plates, mesh, or coalescers. Decanters may be utilized separately in the disclosure herein or in combination with other types of equipment for promoting density liquid separation. Other suitable equipment for promoting density liquid separation includes centrifuges and hydrocyclones.

Once the reaction product of hydrogen sulfide and the amine, and optionally the reaction product of carbon dioxide and the amine, has formed in the aqueous solution, the temperature of the aqueous solution may be increased to at least the critical solution temperature if a light phase and a heavy phase have not already formed. In non-limiting examples, heating of the aqueous solution may be accomplished through heat exchange with a liquid phase obtained following regeneration (e.g., from a regeneration tower). In non-limiting examples, the critical solution temperature may be about 50° C. or greater, such as from about 50° C. to about 150° C., or from about 75° C. to about 140° C., or from about 90° C. to about 130° C. Heating of the aqueous solution, if performed, may take place in the vessel in which phase separation takes place or upstream of the vessel where phase separation takes place, such as a decanter. In non-limiting process configurations, heating of the aqueous solution to facilitate phase separation may be promoted by a heat exchanger in thermal communication with a regeneration tower that processes the light phase or the heavy phase following density liquid separation.

Processing of the light phase or the heavy phase may take place in a regeneration tower at a temperature sufficient to desorb at least a portion of the hydrogen sulfide therefrom. Suitable temperatures that may be employed in the regeneration tower include about 80° C. to about 180° C., or about 110° C. to about 150° C., for example. Suitable regeneration towers may include any of those conventionally used in the gas processing industry.

In some process configurations, the reaction product of the hydrogen sulfide and the amine may be present substantially in the heavy phase, in which case the light phase may be recycled, directly or indirectly, to the absorber tower without undergoing regeneration. That is, since the light phase comprising the amine is largely free of hydrogen sulfide, the light phase may remain sufficiently active for promoting further acid gas removal without undergoing processing in a regeneration tower. As referenced above, such configurations may lower the processing burden at the regeneration tower by decreasing the liquid throughput therethrough. The heavy phase may be processed by regeneration and returned to the absorber tower.

Figure 2:
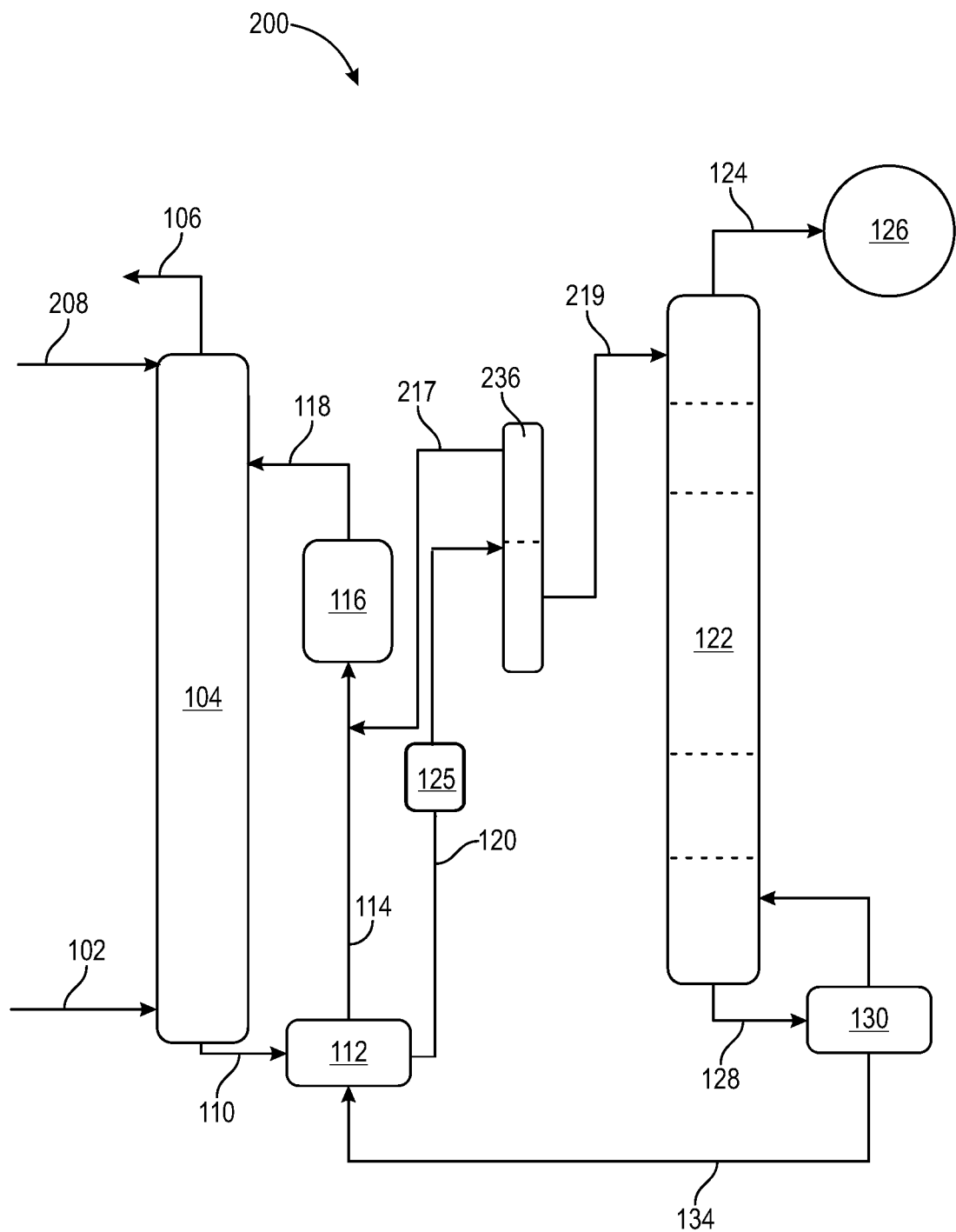
FIGS. 2, 3A and 3B show diagrams of amine-based systems for acid gas scrubbing, in which a separator is used to separate a light phase and a heavy phase following acid gas capture.

FIG. 2 shows a diagram of an amine-based system for acid gas scrubbing, in which a separator is used to separate a light phase and a heavy phase following acid gas capture. System 200 may be applicable for processing an aqueous solution comprising the amine in process configurations in which an acid gas of interest, such as hydrogen sulfide, is present substantially in the heavy phase following phase separation. Elements of FIG. 2 having a similar function to those present in FIG. 1 are labelled with common reference characters and are not described again in detail.

Referring still to FIG. 2, heat exchanged aqueous solution 120 is received from absorber tower 104 and heat exchanger 112 into separator 236, such as a decanter, wherein phase separation into a light phase comprising the amine and a heavy phase comprising water may occur above the critical solution temperature. Heating to the critical solution temperature may take place at separator 236 or upstream thereof, such as in heat exchanger 112. Additional heating of heat exchanged aqueous solution 120 may also occur at optional heater 125, if further heating is needed to promote separation into a light phase and a heavy phase (i.e., if the critical solution temperature is not exceeded). In the case of the light phase being lean in hydrogen sulfide, the light phase may be returned to absorber tower 104, either directly or indirectly, via amine recycle line 217, thereby leaving the heavy phase comprising the reaction product of hydrogen sulfide and the amine in separator 236. As such, the light phase is not processed by regeneration (e.g., in regeneration tower 122) before returning to absorber tower 104.

The heavy phase in separator 236 is conveyed via heavy phase processing line 219 to regeneration tower 122, wherein processing to remove at least some hydrogen sulfide, and optionally other acid gasses, may take place to provide acid gas stream 124. The heavy phase has a decreased volume relative to conventional regeneration processes not employing phase separation. Processing of the heavy phase may take place under the general conditions described above, including under conditions similar to those taking place in conventional acid gas scrubbing processes, except for not simultaneously processing the amine comprising the light phase. Once processing of the heavy phase has taken place to remove at least some hydrogen sulfide, the heavy phase is subsequently conveyed to heat exchanger 112, or a location upstream or downstream therefrom, and returned to absorber tower 104. Although FIG. 2 has shown the light phase and the heavy phase being returned to absorber tower 104 as a combined stream following processing of the heavy phase, it is to be appreciated that the light phase and the heavy phase may also be returned to the top of absorber tower 104 as separate streams, if desired. To account for water lost during regeneration, make-up water 208 may be fed into absorber tower 104, if needed. Make-up water 208 may be fed at or near the top of absorber tower 104.

In other process configurations, the reaction product of the hydrogen sulfide and the amine may be present substantially in the light phase, in which case the light phase may be separately processed to remove at least some hydrogen sulfide therefrom before recycling the light phase to the absorber tower. In this case, the heavy phase may be recycled directly or indirectly to the absorber tower without being processed in a regeneration tower. Again, a reduced processing burden at the regeneration tower may be realized by decreasing the liquid throughput therethrough.

Other acid gases may be present in the gas mixture, such as carbon dioxide, thereby leading to formation of a reaction product of the carbon dioxide and the amine A majority of the reaction product of the carbon dioxide and the amine may be present in the heavy phase. That is, in such process configurations, the reaction product of the hydrogen sulfide and the amine and the reaction product of the carbon dioxide and the amine may be present in different phases. Processing of the heavy phase to remove at least some carbon dioxide therefrom may take place without exposing the heavy phase to the regeneration tower. Alternatively, since the carbon dioxide burden in the heavy phase is expected to be lower under kinetically controlled contacting conditions, initial processing of the heavy phase by flashing may sufficiently decrease the carbon dioxide content to facilitate further processing in combination with the light phase in the regeneration tower.

Figure 3A:
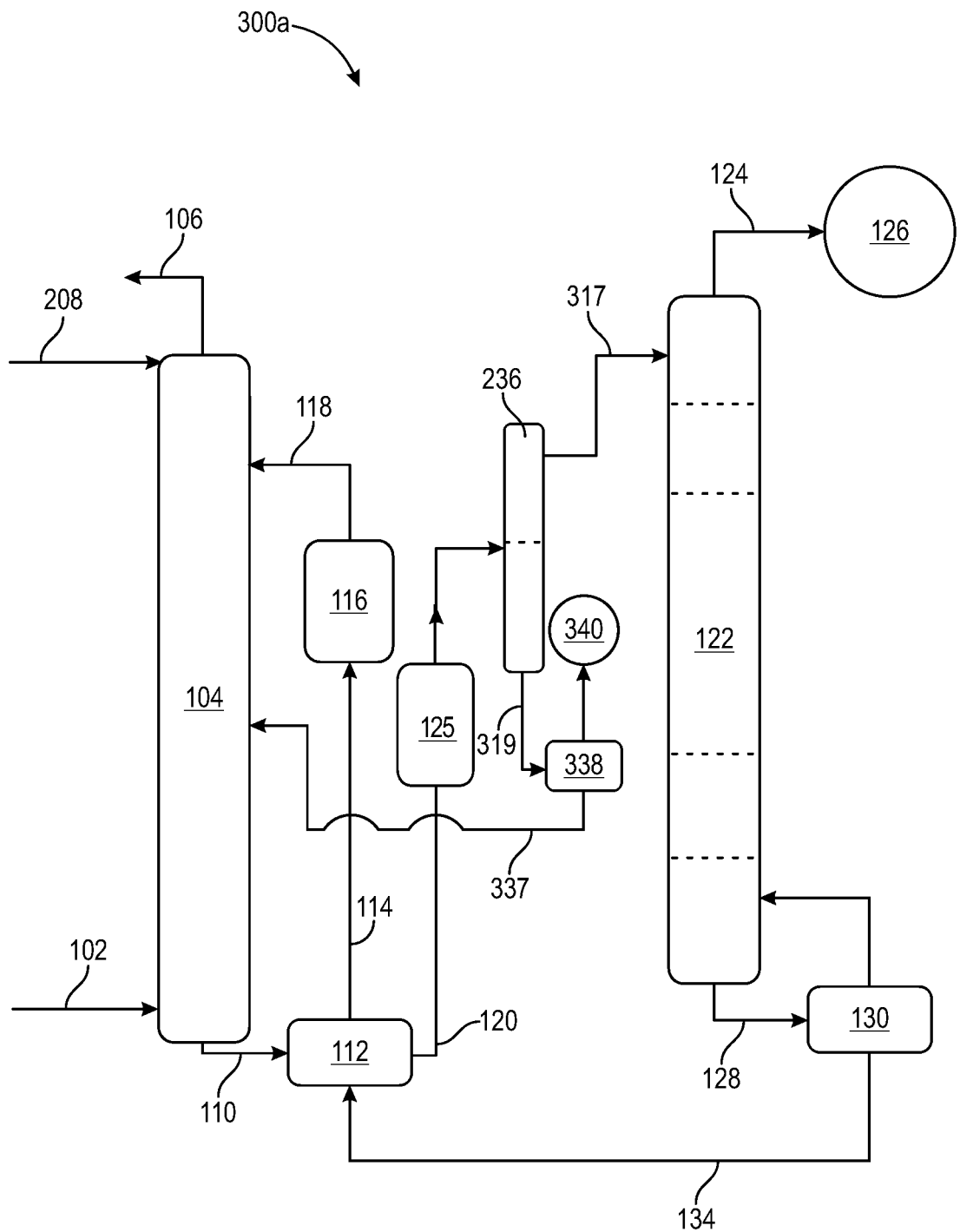
Figure 3B:
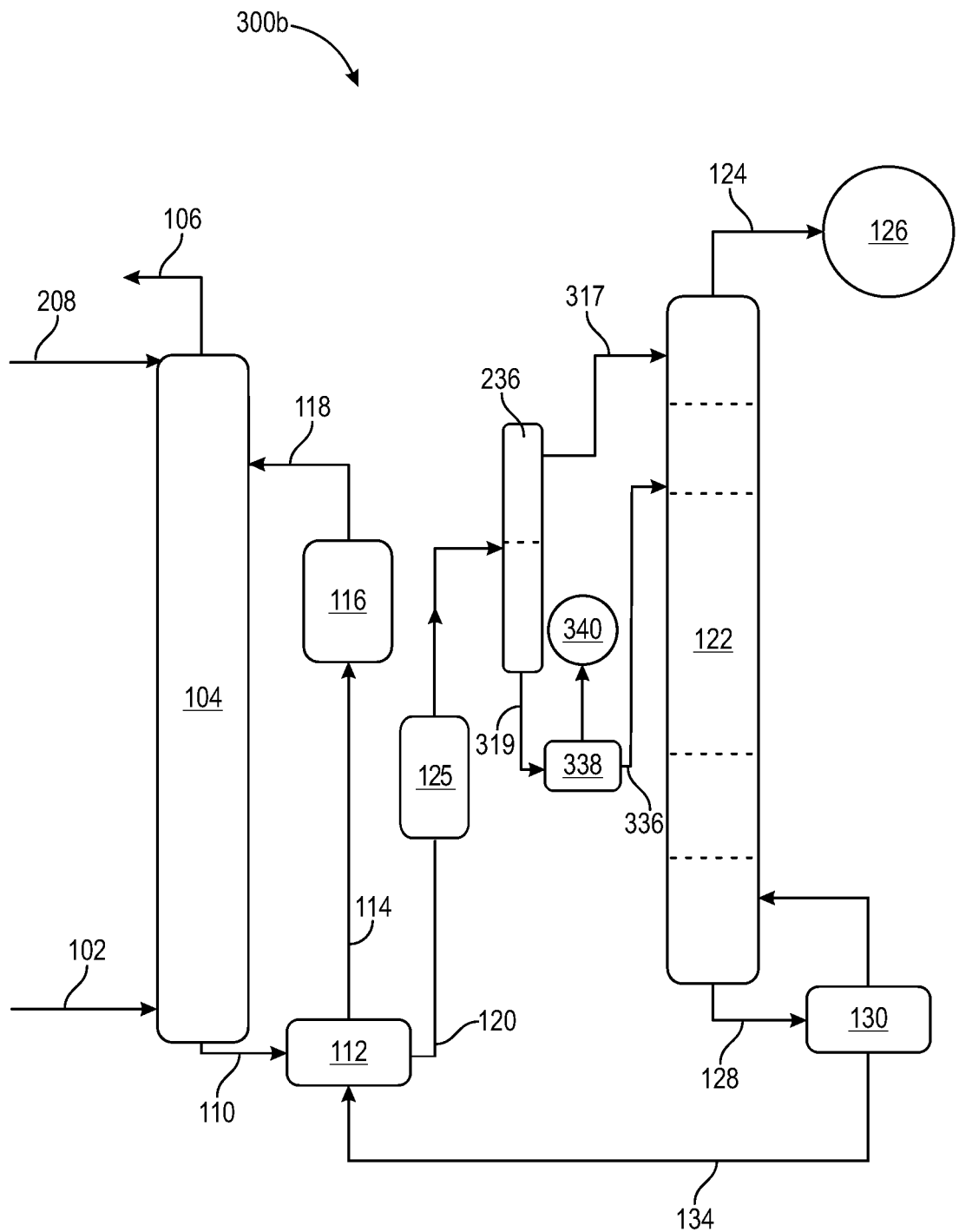

FIGS. 3A and 3B show diagrams of amine-based systems for acid gas scrubbing, in which a separator is used to separate a light phase and a heavy phase following acid gas capture. Systems 300*a* and 300*b* may be applicable for processing an aqueous solution comprising an amine in process configurations in which an acid gas of interest, such as hydrogen sulfide, is present substantially in a light phase following phase separation. Elements of FIGS. 3A and 3B having a similar function to those shown in FIGS. 1 and 2 are labelled with common reference characters and are not described again in detail.

Referring to FIGS. 3A and 3B, heat exchanged aqueous solution 120 is again received from absorber tower 104 and heat exchanger 112 into separator 236 in a similar manner to that shown in FIG. 2, wherein phase separation into a light phase comprising the amine and a heavy phase comprising water may occur at or above the critical solution temperature. Heating to the critical solution temperature may take place at separator 236 or upstream thereof, such as at heat exchanger 112. Additional heating of heat exchanged aqueous solution 120 may also occur at optional heater 125, if further heating is needed to promote separation into a light phase and a heavy phase. Such additional heating upstream from separator 236 may occur in any process configuration disclosed herein. In the case of the light phase containing a majority of the reaction product of the hydrogen sulfide and the amine, the light phase may be conveyed via light phase processing line 317 to regeneration tower 122, wherein removal of at least some hydrogen sulfide may take place to provide acid gas stream 124.

The heavy phase, which may contain a reaction product of carbon dioxide and the amine, is then removed from separator 236 via heavy phase processing line 319 and conveyed to flash unit 338, wherein removal of at least some carbon dioxide may take place to provide carbon dioxide stream 340. The carbon dioxide may be provided to a carbon capture station (not shown), if desired, for processing the carbon dioxide into a more acceptable form. In the process configuration shown in FIG. 3A, the heavy phase, now at least partially depleted of carbon dioxide, may be returned directly to absorber tower 104 via heavy phase recycle line 337. Accordingly, in such process configurations, processing of the heavy phase in regeneration tower 122 may be avoided, thereby reducing the separation burden thereon compared to conventional acid gas scrubbing processes. System 300b, shown in FIG. 3B, provides an alternative process configuration, wherein the heavy phase, now at least partially depleted of carbon dioxide, is provided to mid-tower to regeneration tower 122 for concurrent processing with the light phase. Because the carbon dioxide has been at least partially removed in flash unit 338, co-processing the heavy phase along with the light phase in regeneration tower 122 does not represent a significant separation burden increase in comparison to the process configuration shown in FIG. 3A. In system 300b, the heavy phase and the light phase may then be returned concurrently to absorber tower 104, either directly or indirectly.

After leaving regeneration tower 122 and reboiler 130, regenerated aqueous amine solution 134 is provided to heat exchanger 112 to dissipate excess heat therefrom. Subsequently, regenerated aqueous amine solution 134 is conveyed to absorber tower 104. Although not shown in FIG. 3A or 3B, regenerated aqueous amine solution 134 may be split into two streams, wherein a first stream is provided to heat exchanger 112 and a second stream is utilized to heat light phase processing line 317. Providing excess heat from regenerated aqueous amine solution 134 to light phase processing line 317 may lessen the heating burden for regeneration tower 122. In the foregoing configuration, regenerated aqueous amine solution 134 provided to light phase processing line 317 may simply undergo processing a second time in regeneration tower 122.

Further alternatively, the light phase and the heavy phase may be regenerated concurrently using two regeneration towers operating in parallel, optionally after flashing the heavy phase, wherein separate acid gas streams may be obtained therefrom. The light phase and the heavy phase obtained from the parallel regeneration towers may be recycled to the absorber tower together or separately.

In still another alternative process configuration, the light phase and the heavy phase may be regenerated concurrently using a divided wall regeneration tower, optionally after flashing the heavy phase, wherein a combined acid gas stream is obtained therefrom. Again, the light phase and the heavy phase may be recycled to the absorber tower together or separately after being processed in the divided wall regeneration tower. Suitable divided wall regeneration towers are described in U.S. Pat. No. 10,155,192, which is incorporated herein by reference.

While not explicitly described or depicted in FIGS. 2, 3A, and 3B, it is to be appreciated that there may be other operational components including, but not limited to, additional piping, valves, pumps, heat exchangers, filters, and the like that may be needed to implement a particular process configuration.

While the disclosure herein provides certain advantages of kinetically controlled contacting conditions when using phase-separating amines having selectivity for hydrogen sulfide binding, it is also to be appreciated that the disclosure herein may also be practiced under other operating conditions, such as equilibrium or thermodynamically controlled contacting conditions. Therefore, scrubbing may alternatively be carried out under equilibrium or thermodynamically controlled contacting conditions in an absorber tower. As used herein, "equilibrium contacting conditions" and "thermodynamically controlled contacting conditions" refer equivalently to a contact time of at least about 30 seconds, or at least about 30 minutes, or at least about 1 hour, such as from about 1 minute to about 10 minutes, or from about 10 minutes to about 30 minutes, or from about 30 minutes to about 1 hour, or from about 1 hour to about 10 hours, or from about 3 hours to about 8 hours, or from about 4 hours to about 6 hours. It is to be appreciated that the timeframe for kinetically controlled contacting conditions and thermodynamically controlled contacting conditions may overlap for various amines That is, a particular contacting time may represent kinetically controlled contacting conditions for one amine and thermodynamically controlled contacting conditions for another amine Given the benefit of the present disclosure, one having ordinary skill in the art may determine kinetically controlled contacting conditions suitable to convey binding selectivity for hydrogen sulfide for a given amine. Thermodynamically controlled contacting conditions for removing at least one acid gas from a gas mixture may take place under continuous or batch processing conditions. It is to be appreciated that the distribution and amount of acid gases, particularly hydrogen sulfide and carbon dioxide, captured in the aqueous solution may be different than those obtained under kinetically controlled contacting conditions according to the disclosure above. For example, when contacting is performed under thermodynamically controlled contacting conditions, the amines disclosed herein may show selectivity for forming a reaction product with carbon dioxide (e.g., bicarbonate) instead of hydrogen sulfide, since the reaction of carbon dioxide and the amine is more thermodynamically favored. Additionally, under thermodynamically controlled contacting conditions, the acid gas loading of in the aqueous solution may be increased when compared to that obtained under kinetically controlled contacting conditions.

Embodiments disclosed herein include:

A. Methods for selectively capturing hydrogen sulfide from a gas mixture. The methods comprise: contacting a gas mixture comprising hydrogen sulfide with an aqueous solution comprising an amine in an absorber tower under kinetically controlled contacting conditions; wherein the amine has a higher binding selectivity for hydrogen sulfide than for carbon dioxide under the kinetically controlled contacting conditions, and the aqueous solution undergoes liquid phase separation above a critical solution temperature; forming a reaction product of the hydrogen sulfide and the amine in the aqueous solution; heating the aqueous solution to a temperature greater than or equal to the critical solution temperature, thereby forming a light phase comprising the amine and a heavy phase comprising water; wherein a majority of the reaction product of the hydrogen sulfide and the amine is present in either the light phase or the heavy phase; separating the light phase from the heavy phase; processing one of the light phase or the heavy phase to remove at least some hydrogen sulfide therefrom; and after separating the light phase from the heavy phase, recycling at least a portion of the light phase to the absorber tower.

Embodiment A may have one or more of the following elements in any combination:

Element 1: wherein the amine comprises a sterically hindered secondary amine comprising at least one tertiary alkyl group bound to a nitrogen atom of the amine, a tertiary amine, or any combination thereof.

Element 2: wherein the amine has a critical solution temperature of about 140° C. or below and comprises at least one secondary or tertiary amine represented by a structure selected from the group consisting of

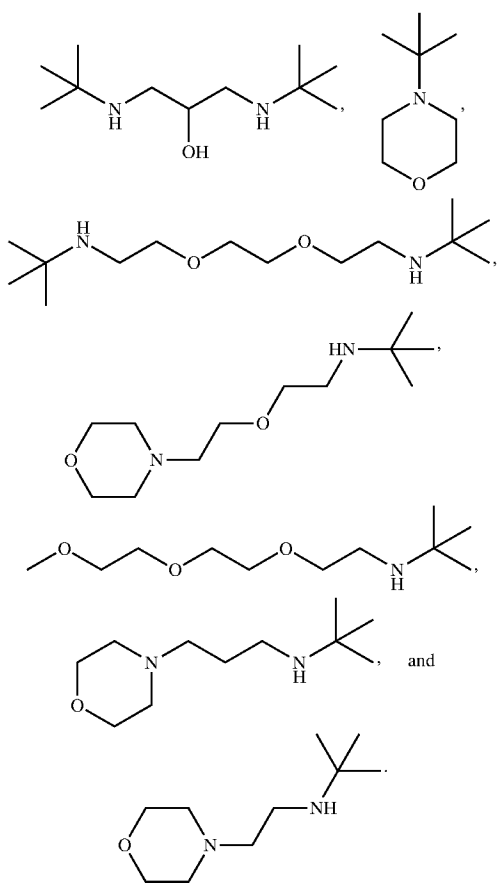

Element 3: wherein the gas mixture further comprises carbon dioxide, and a reaction product of the carbon dioxide and the amine is formed in the aqueous solution; wherein the reaction product of the carbon dioxide and the amine is present in either the same phase or a different phase than the reaction product of the hydrogen sulfide and the amine.

Element 4: wherein separating the light phase from the heavy phase takes place by density liquid separation.

Element 5: wherein binding selectivity for hydrogen sulfide over carbon dioxide is specified by the ratio $$\frac{([H_2S]/[CO_2])_{aqueous\ solution}}{([H_2S]/[CO_2])_{gas\ mixture}}$$

wherein $([H_2S]/[CO_2])_{aqueous\ solution}$ is a molar ratio of hydrogen sulfide to carbon dioxide in the aqueous solution and $([H_2S]/[CO_2])_{gas\ mixture}$ is a molar ratio of hydrogen sulfide to carbon dioxide in the gas mixture, wherein the ratio is greater than or equal to 8.

Element 6: wherein the aqueous solution has an amine concentration ranging from about 15 wt % amine to about 70 wt % amine.

Element 7: wherein the reaction product of the hydrogen sulfide and the amine is present substantially in the heavy phase, and the light phase is recycled to the absorber tower without being regenerated.

Element 8: wherein the heavy phase is processed in a regeneration tower to remove at least some hydrogen sulfide therefrom.

Element 9: wherein the method further comprises returning at least a portion of the heavy phase to the absorber tower after removing at least some hydrogen sulfide therefrom.

Element 10: wherein the reaction product of the hydrogen sulfide and the amine is present substantially in the light phase, and the light phase is processed in a regeneration tower to remove at least some hydrogen sulfide therefrom before recycling the light phase to the absorber tower.

Element 11: wherein the gas mixture further comprises carbon dioxide, a reaction product of the carbon dioxide and the amine is formed in the aqueous solution, and a majority of the reaction product of the carbon dioxide and the amine is present in the heavy phase.

Element 12: wherein the method further comprises processing the heavy phase to remove at least some carbon dioxide therefrom.

Element 13: wherein the method further comprises returning at least a portion of the heavy phase to the absorber tower after removing at least some carbon dioxide therefrom.

Element 14: wherein the light phase and the heavy phase are returned to the absorber tower together in a combined stream.

Element 15: wherein the light phase and the heavy phase are returned to the absorber tower in separate streams.

Element 16: wherein the gas mixture and the aqueous solution are contacted under countercurrent conditions in the absorber tower.

Element 17: wherein the kinetically controlled contacting conditions comprise a residence time of about 2 minutes or less in the absorber tower.

Element 18: wherein the kinetically controlled contacting conditions comprise a temperature of about 30° C. to about 80° C.

Element 19: wherein processing one of the light phase or the heavy phase takes place in a regeneration tower at a temperature of about 110° C. to about 150° C.

Element 20: wherein the critical solution temperature is about 50° C. or greater.

Element 21: wherein the aqueous solution further comprises triethylene glycol monomethyl ether (MTEG), sulfolane, phosphoric acid, sulfuric acid, or any combination thereof.

By way of non-limiting example, exemplary combinations applicable to A include, but are not limited to: 1 or 2, and 3; 1 or 2, and 4; 1 or 2, and 5; 1 or 2, and 6; 1 or 2, and 7; 1 or 2, 7 and 8; 1 or 2, and 7-9; 1 or 2, and 10; 1 or 2, 10 and 11; 1 or 2, and 10-12; 1 or 2, 10, 11 and 13; 1 or 2, 10, 11 and 14; 1 or 2, 10, 11, 13 and 14; 1 or 2, 10, 11 and 15; 1 or 2, 10, 11, 13 and 15; 1 or 2, and 16; 1 or 2, 16 and 17; 1 or 2, and 16-18; 1 or 2, and 19; 1 or 2, and 20; 1 or 2, and 21; 3 and 4; 3 and 5; 3 and 6; 3 and 7; 3 and 10; 3, 10 and 11; 3 and 16; 3, 16 and 17; 3, 16 and 18; 3 and 16-18; 3 and 19; 3 and 20; 3 and 21; 7 and 8; 7 and 9; 7-9; 7 and 16; 7 and 17; 7 and 18; 7, 16 and 17; 7, 16 and 18; 7 and 16-18; 7 and 21; 10 and 11; 10-12; 10, 11 and 13; 10, 11 and 14; 10-13; 10, 11 and 14; 10, 11 and 15; 10-14; 10-13, 15; 10 and 16; 10 and 17; 10 and 18; 10, 16 and 17; 10 and 16-18; 10 and 21; 16 and 17; 16 and 18; 16-18; 16 and 19; 16 and 20; 16 and 21; 17 and 19; 17 and 20; 17 and 21; 18 and 19; 18 and 20; 18 and 21; 19 and 20; 19 and 21; and 20 and 21.

To facilitate a better understanding of the present disclosure, the following examples of preferred or representative embodiments are given. In no way should the following examples be read to limit, or to define, the scope of the disclosure.

EXAMPLES

Example 1: Amine Phase Separation. The critical solution temperature for phase separation of various amines was determined by placing an aqueous amine solution in a sealed vessel containing a sight glass. Aqueous solution concentrations for each amine are specified in Table 2 below. At room temperature, all of the aqueous solutions were clear and monophasic. The aqueous solutions were heated from room temperature to a maximum temperature of about 140° C., and the temperature at which the solutions became cloudy and presented phase separation was recorded. Phase separation temperatures are provided in Table 2. A conventionally employed amine, 2-(2-(tert-butylamino)ethoxy) ethanol (EETB), also referred to as ethoxyethanol-tert-butylamine, which does not undergo phase separation up to 140° C. is also listed for comparison. Formula numbers below correspond to those shown in Table 1.

TABLE 2

| Chemical Structure | Amine Concentration (wt %) | Critical Solution Temperature (° C.) |
| --- | --- | --- |
| ethoxyethanol-tert-butylamine (EETB) | 30% | >140 |
| 1,3-bis(tert-butylamino)propan-2-ol<br>Formula 1 | 30% | <90 |
| 1,2-bis(tert-butylaminoethoxy)ethane<br>Formula 2 | 30% | 60 |
| methoxyethoxyethoxyethyl-tert-butylamine<br>Formula 3 | 36% | 107 |

TABLE 2-continued

| Chemical Structure | Amine Concentration (wt %) | Critical Solution Temperature (° C.) |
|---|---|---|
| tert-butylmorpholine<br>Formula 4 | 30% | 50 |
| 1-(2-(tert-butylamino)ethyl)pyrrolidin-2-one<br>Formula 5 | 36% | >140 |
| tert-butylaminoethoxyethylmorpholine<br>Formula 6 | 36% | 131 |
| tert-butylaminoethylmorpholine<br>Formula 7 | 36% | 103 |
| tert-butylaminopropylmorpholine<br>Formula 8 | 30% | 95 |

The effect of various additives upon the phase separation behavior was also tested. Table 3 reports the results of these experiments (MTEG=triethylene glycol monomethyl ether; MDEA=N-methyldiethanolamine; EETB=ethoxyethanol-tert-butylamine

TABLE 3

| Formula No. | Amine Concentration (wt %) | Additive Concentration (wt %) | Critical Solution Temperature (° C.) |
|---|---|---|---|
| 3 | 36% | None | 107 |
|  | 30% | 5% MTEG | 128-130 |
|  | 30% | 5% MTEG + 1.6% $H_3PO_4$ | 124 |
|  | 30% | 10% MTEG + 1.6% $H_3PO_4$ | >140 |
|  | 30% | 10% MTEG + 2% $H_2SO_4$ | >140 |
|  | 30% | 10% MTEG + 4% $H_2SO_4$ | >140 |
|  | 25% | 8.3% MTEG + 2% $H_2SO_4$ | >140 |
|  | 35% | 11.7% MTEG + 2% $H_2SO_4$ | >140 |
|  | 30% | 10% sulfolane + 2% $H_2SO_4$ | >140 |
|  | 30% | 5% sulfolane + 2% $H_2SO_4$ | 137-139 |
|  | 30% | 10% MDEA + 2% $H_2SO_4$ | 129 |
| 6 | 36% | None | 131 |
|  | 36% | 2% $H_2SO_4$ | 125 |
|  | 36% | 5% MDEA + 2% $H_2SO_4$ | 134 |
|  | 36% | 5% EETB + 2% $H_2SO_4$ | 128-130 |
|  | 36% | 5% sulfolane + 2% $H_2SO_4$ | >140 |
|  | 36% | 2.5% sulfolane + 2% $H_2SO_4$ | 132 |
| 7 | 36% | None | 103 |
|  | 36% | 2% $H_2SO_4$ | 91 |
|  | 36% | 10% MDEA + 2% $H_2SO_4$ | 117 |
|  | 36% | 10% sulfolane + 2% $H_2SO_4$ | 132 |

Example 2: $H_2S$ Binding Conditions and Experiments. The $H_2S$ binding selectivity for various aqueous amine solutions disclosed herein was determined by exposing a test acid gas mixture containing 10 mol % $CO_2$, 1 mol % $H_2S$, and balance nitrogen ($N_2$) to the aqueous amine solution. Unless otherwise indicated testing conditions were the same in all cases. The test acid gas mixture was introduced to an autoclave containing 15 mL of the aqueous amine solution. The test acid gas mixture was fed to the bottom of the autoclave at a rate of 154 sccm, bypassing the water saturator, and exposed to the aqueous amine solution with stirring at a temperature of 40.8° C. and a pressure of 1 bar. Contacting was conducted at a tau value of 0.1, wherein the tau value is the passage time and is equal to the volume of the aqueous amine solution divided by the gas flow rate. The gasses leaving the autoclave were transferred through a condenser kept at 10° C. in order to remove any entrained liquids. A slipstream of the gasses leaving the condenser was introduced to a micro-GC for analysis while the main gas flow passed into a scrubber. After reaching breakthrough, nitrogen was used to purge the system.

The gas composition exiting the autoclave was analyzed using the custom built micro-GC. The micro-GC was configured as a refinery gas analyser and includes 4 columns (HP-Plot Molesieve (from Agilent), HP-PLOT U (from Agilent), OV™-1 (from Ohio Valley Specialty Company), and HP-PLOT Q (from Agilent) and four thermal conductivity detectors. The slip stream was injected into the micro-GC approximately every 2 minutes at an injection volume of about 1 µL. The HP-PLOT U column was used to separate and identify $H_2S$ and $CO_2$, and the micro-TCD was used to quantify these gasses. Selectivity was determined using Equation 1 from above.

Figure 4:
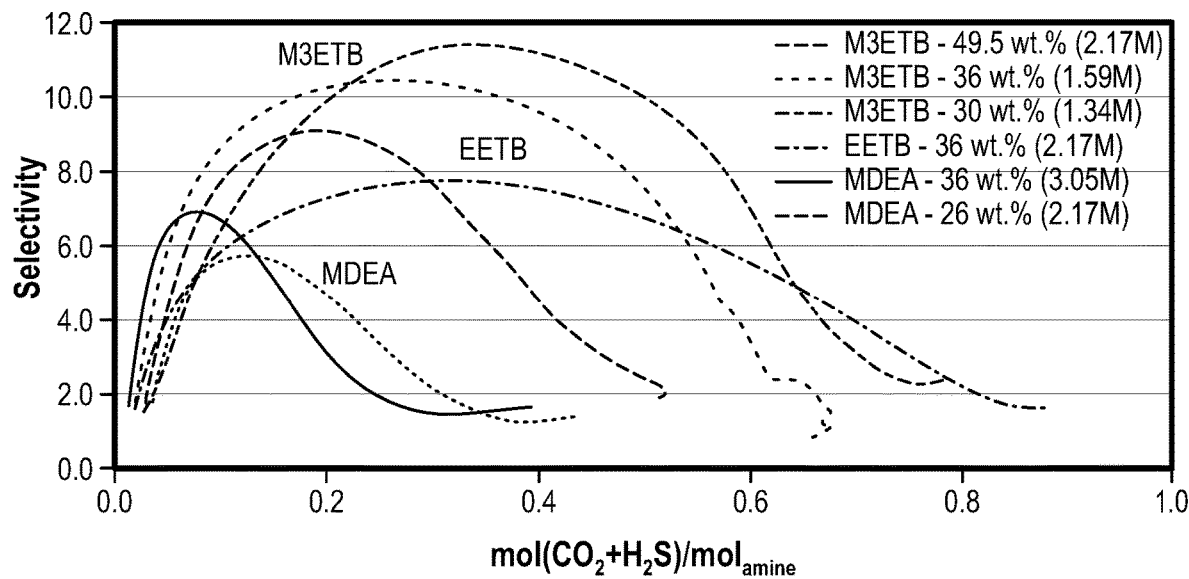
FIG. 4 is a graph showing $H_2S$ selectivity of aqueous amine solutions comprising methoxyethoxyethoxyethyl-tert-butylamine (M3ETB) in comparison to EETB.

FIG. 4 is a graph showing $H_2S$ selectivity of aqueous amine solutions comprising methoxyethoxyethoxyethyl-tert-butylamine (M3ETB, Formula 3) in comparison to EETB. The aqueous amine solutions comprising M3ETB exhibited a higher $H_2S$ binding selectivity than did EETB. The 30 wt % M3ETB solution was more selective for acid gas binding up to an acid gas loading of about 0.65 $mol_{acid\ gas}/mol_{amine}$, and the 36 wt % M3ETB solution was selective up to an acid gas loading of about 0.58 $mol_{acid\ gas}/mol_{amine}$. The 49.5 wt % M3ETB solution, in contrast, was selective only up to an acid gas loading of about 0.3 $mol_{acid\ gas}/mol_{amine}$. The binding selectivity for MDEA was even poorer.

Figure 5:
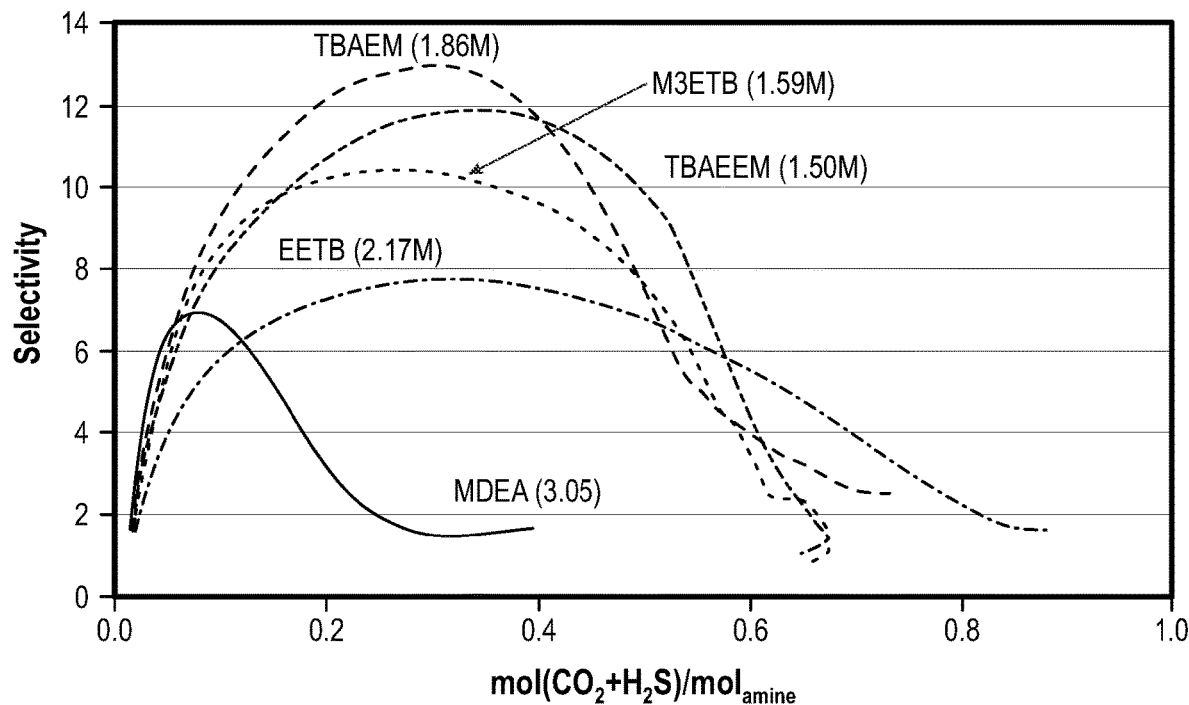
FIG. 5 is a graph showing $H_2S$ selectivity of aqueous amine solutions comprising tert-butylaminoethoxyethyl-morpholine (TBAEEM), M3ETB, and TBAEM in comparison to EETB.

FIG. 5 is a graph showing $H_2S$ selectivity of aqueous amine solutions comprising tert-butylaminoethoxyethylmorpholine (TBAEEM, Formula 6), methoxyethoxyethoxyethyl-tert-butylamine (M3ETB, Formula 3), and tert-butylaminoethylmorpholine (TBAEM, Formula 7) in comparison to EETB. The amine concentration was 36 wt % in each case. TBAEM, TBAEEM and M3ETB exhibited higher $H_2S$ binding selectivity than did EETB up to acid gas loadings of 0.5-0.6 $mol_{acid\ gas}/mol_{amine}$. The binding selectivity for MDEA was even poorer.

Figure 6A:
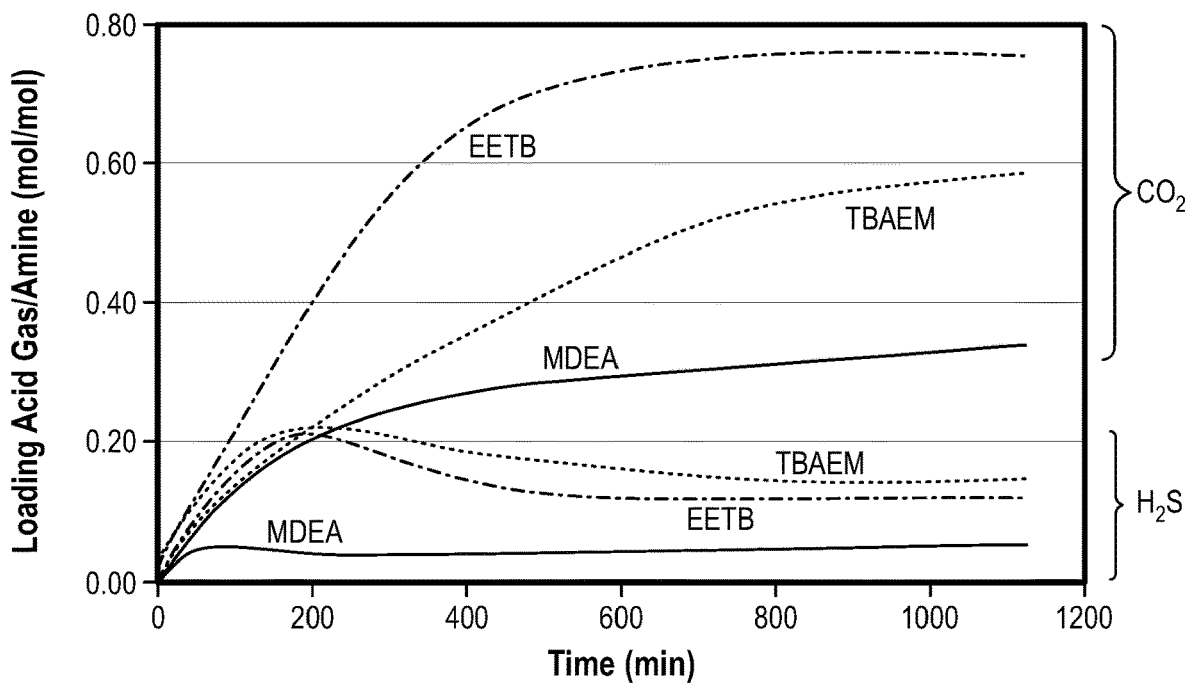
FIGS. 6A and 6B are graphs showing the effect of contact time on acid gas loading of aqueous amine solutions comprising TBAEM in comparison to EETB.
Figure 6B:
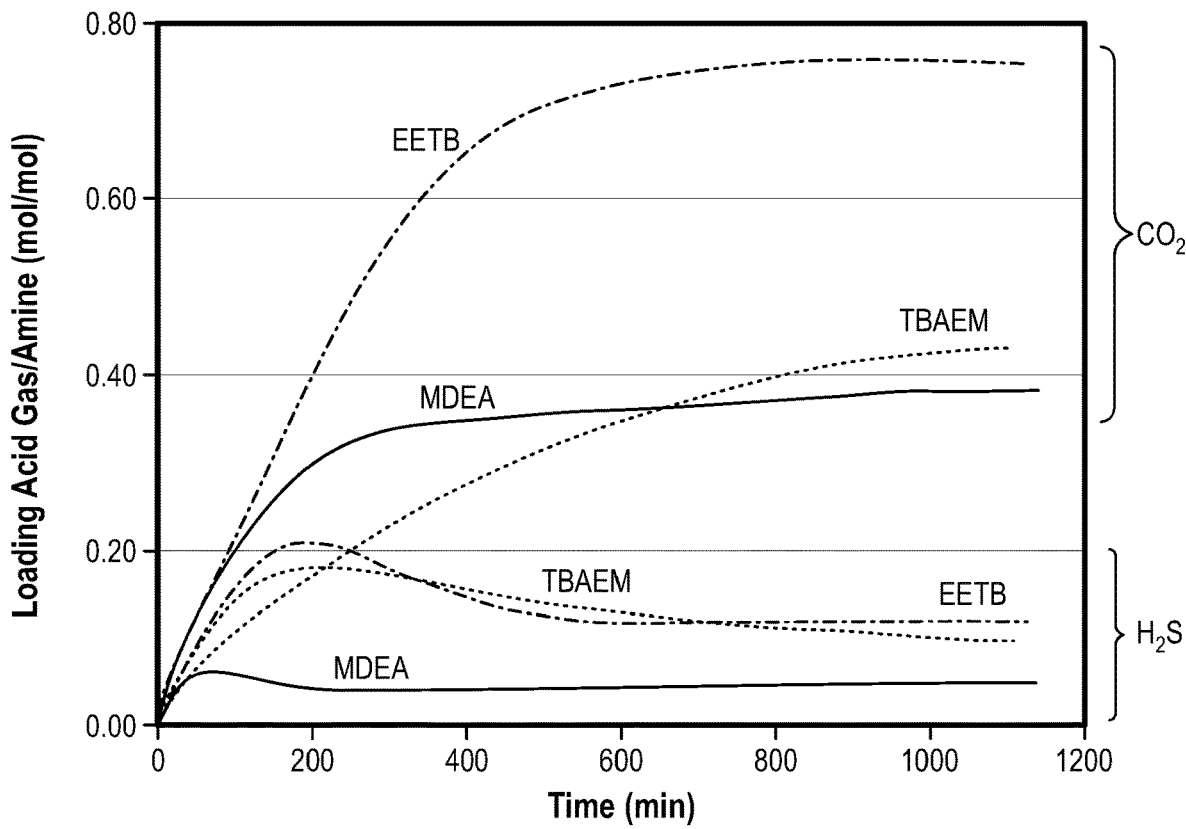

FIGS. 6A and 6B are graphs showing the effect of contact time on acid gas loading of aqueous amine solutions comprising tert-butylaminoethoxyethylmorpholine (TBAEEM, Formula 6) in comparison to EETB. The concentration of the amine solution was 36 wt % in FIG. 6A and 42 wt % in FIG. 6B. A mixture of $H_2S$ and $CO_2$ was exposed to the amine solution in each case. Separate curves are shown for the loading of each acid gas over time. As shown, the acid gas binding increased with time as the thermodynamic reaction product formed. At short contact times, the binding performance of TBAEEM was comparable to that of EETB. The performance of MDEA was poorer in both instances.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method comprising:
    contacting a gas mixture comprising hydrogen sulfide with an aqueous solution comprising an amine in an absorber tower under kinetically controlled contacting conditions; wherein the amine has a higher binding selectivity for hydrogen sulfide than for carbon dioxide under the kinetically controlled contacting conditions, wherein binding selectivity for hydrogen sulfide over carbon dioxide is specified by the ratio $$\frac{([H_2S]/[CO_2])_{aqueous\ solution}}{([H_2S]/[CO_2])_{gas\ mixture}}$$

wherein $([H_2S]/[CO_2])_{aqueous\ solution}$ is a molar ratio of hydrogen sulfide to carbon dioxide in the aqueous solution and $([H_2S]/[CO_2])_{gas\ mixture}$ is a molar ratio of hydrogen sulfide to carbon dioxide in the gas mixture, wherein the ratio is greater than or equal to 8; and wherein the aqueous solution undergoes liquid phase separation above a critical solution temperature;
    forming a reaction product of the hydrogen sulfide and the amine in the aqueous solution;
    heating the aqueous solution to a temperature greater than or equal to the critical solution temperature, thereby forming a light phase comprising the amine and a heavy phase comprising water; wherein a majority of the reaction product of the hydrogen sulfide and the amine is present in either the light phase or the heavy phase;
    separating the light phase from the heavy phase;
    processing one of the light phase or the heavy phase to remove at least some hydrogen sulfide therefrom; and
    after separating the light phase from the heavy phase, recycling at least a portion of the light phase to the absorber tower.

2. The method of claim 1, wherein the amine comprises a sterically hindered secondary amine comprising at least one tertiary alkyl group bound to a nitrogen atom of the amine, a tertiary amine, or any combination thereof.

3. The method of claim 1, wherein the amine has a critical solution temperature of about 140° C. or below and comprises at least one secondary or tertiary amine represented by a structure selected from the group consisting of

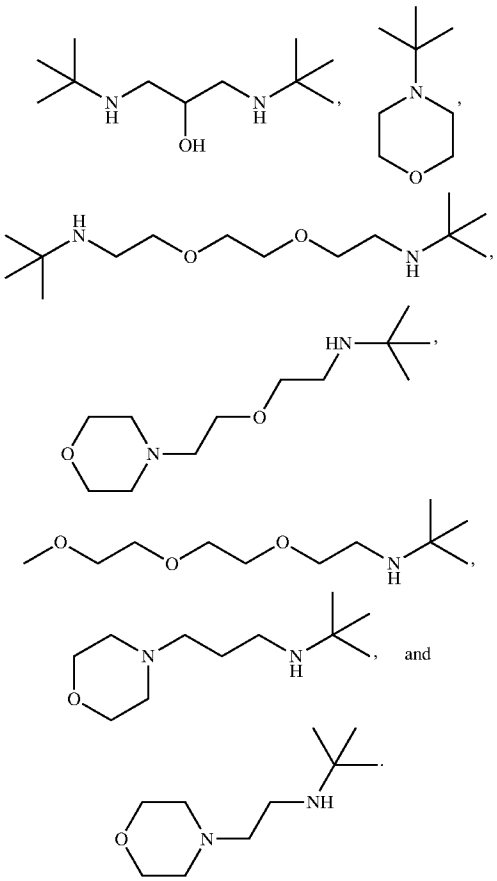

4. The method of claim 1, wherein the gas mixture further comprises carbon dioxide, and a reaction product of the carbon dioxide and the amine is formed in the aqueous solution;
    wherein the reaction product of the carbon dioxide and the amine is present in either the same phase or a different phase than the reaction product of the hydrogen sulfide and the amine.

5. The method of claim 1, wherein separating the light phase from the heavy phase takes place by density liquid separation.

6. The method of claim 1, wherein the aqueous solution has an amine concentration ranging from about 15 wt % amine to about 70 wt % amine.

7. The method of claim 1, wherein the heavy phase is processed in a regeneration tower to remove at least some hydrogen sulfide therefrom.

8. The method of claim 7, further comprising:
returning at least a portion of the heavy phase to the absorber tower after removing at least some hydrogen sulfide therefrom.

9. The method of claim 1, wherein the gas mixture further comprises carbon dioxide, a reaction product of the carbon dioxide and the amine is formed in the aqueous solution, and a majority of the reaction product of the carbon dioxide and the amine is present in the heavy phase.

10. The method of claim 9, further comprising:
processing the heavy phase to remove at least some carbon dioxide therefrom.

11. The method of claim 10, further comprising:
returning at least a portion of the heavy phase to the absorber tower after removing at least some carbon dioxide therefrom.

12. The method of claim 11, wherein the light phase and the heavy phase are returned to the absorber tower together in a combined stream.

13. The method of claim 11, wherein the light phase and the heavy phase are returned to the absorber tower in separate streams.

14. The method of claim 1, wherein the gas mixture and the aqueous solution are contacted under countercurrent conditions in the absorber tower.

15. The method of claim 1, wherein the kinetically controlled contacting conditions comprise a residence time of about 2 minutes or less in the absorber tower.

16. The method of claim 1, wherein the kinetically controlled contacting conditions comprise a temperature of about 30° C. to about 80° C.

17. The method of claim 1, wherein processing one of the light phase or the heavy phase takes place in a regeneration tower at a temperature of about 110° C. to about 150° C.

18. The method of claim 1, wherein the critical solution temperature is about 50° C. or greater.

19. The method of claim 1, wherein the aqueous solution further comprises triethylene glycol monomethyl ether (MTEG), sulfolane, phosphoric acid, sulfuric acid, or any combination thereof.

* * * * *